US011063620B2

(12) United States Patent
Sulimarski et al.

(10) Patent No.: US 11,063,620 B2
(45) Date of Patent: Jul. 13, 2021

(54) DIGITAL PRE-EMPHASIS QUADRATURE IMBALANCE COMPENSATING FILTER

(71) Applicant: Apple Inc., Cupertino, CA (US)

(72) Inventors: Avi Sulimarski, Kfar Oranim (IL); Oren E. Avraham, Herzlia (IL)

(73) Assignee: Apple Inc., Cupertino, CA (US)

( * ) Notice: Subject to any disclaimer, the term of this patent is extended or adjusted under 35 U.S.C. 154(b) by 826 days.

(21) Appl. No.: 15/168,552

(22) Filed: May 31, 2016

(65) Prior Publication Data

US 2017/0346509 A1 Nov. 30, 2017

(51) Int. Cl.
*H04B 1/04* (2006.01)
*H04B 17/11* (2015.01)

(52) U.S. Cl.
CPC ........... *H04B 1/0475* (2013.01); *H04B 17/11* (2015.01)

(58) Field of Classification Search
CPC ............................ H04B 17/11; H04B 1/0475
See application file for complete search history.

(56) References Cited

U.S. PATENT DOCUMENTS

| | | | |
|---|---|---|---|
| 5,659,581 A | 8/1997 | Betts et al. | |
| 5,923,712 A * | 7/1999 | Leyendecker | ........ H03F 1/3247 375/297 |
| 7,397,850 B2 | 7/2008 | Easley et al. | |
| 8,204,456 B2 | 6/2012 | Xu et al. | |
| 2002/0019220 A1* | 2/2002 | Otaka | ........ H04B 1/28 455/313 |
| 2005/0041754 A1* | 2/2005 | Wu | ........ H04L 27/364 375/295 |
| 2005/0069050 A1* | 3/2005 | Ding | ........ H03C 3/40 375/296 |
| 2006/0098758 A1* | 5/2006 | Luke | ........ H04L 27/3809 375/297 |
| 2010/0109778 A1* | 5/2010 | Ichitsubo | ........ H03F 3/195 330/285 |
| 2013/0243135 A1* | 9/2013 | Row | ........ H04L 27/364 375/350 |

FOREIGN PATENT DOCUMENTS

| | | |
|---|---|---|
| CN | 101175061 A | 5/2008 |
| CN | 101232471 A | 7/2008 |
| CN | 101267187 A | 9/2008 |

* cited by examiner

*Primary Examiner* — Wednel Cadeau
(74) *Attorney, Agent, or Firm* — Eschweiler & Potashnik, LLC

(57) ABSTRACT

A transmitter includes a pre-emphasis digital filter configured to filter a series of respective digital input data samples according to a plurality of coefficients to generate a series of respective corresponding pre-emphasized data samples. The transmitter also includes a digital-to-analog converter (DAC) configured to sample the series of pre-emphasized data samples to generate an analog signal and an analog filter configured to filter the analog signal to generate a filtered signal. Estimator circuitry is configured to input a pre-emphasized data sample; input a corresponding sample of the filtered signal; and calculate the plurality of coefficients based on the sample of the filtered signal and the pre-emphasized data sample.

23 Claims, 5 Drawing Sheets

US 11,063,620 B2

DIGITAL PRE-EMPHASIS QUADRATURE IMBALANCE COMPENSATING FILTER

FIELD

The present disclosure relates to the field of wireless transmitters and in particular to methods and apparatus for conditioning an output signal of digital to analog convertor prior to transmitting the output signal.

BACKGROUND

The wireless technology evolution demands higher signal bandwidth while still supporting legacy bandwidths, which are typically much lower. This trend can be seen in many demanding wireless technologies like WiFi, LTE, and cellular backhauling. Transmitters should be capable, then, of supporting several different signal widths.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
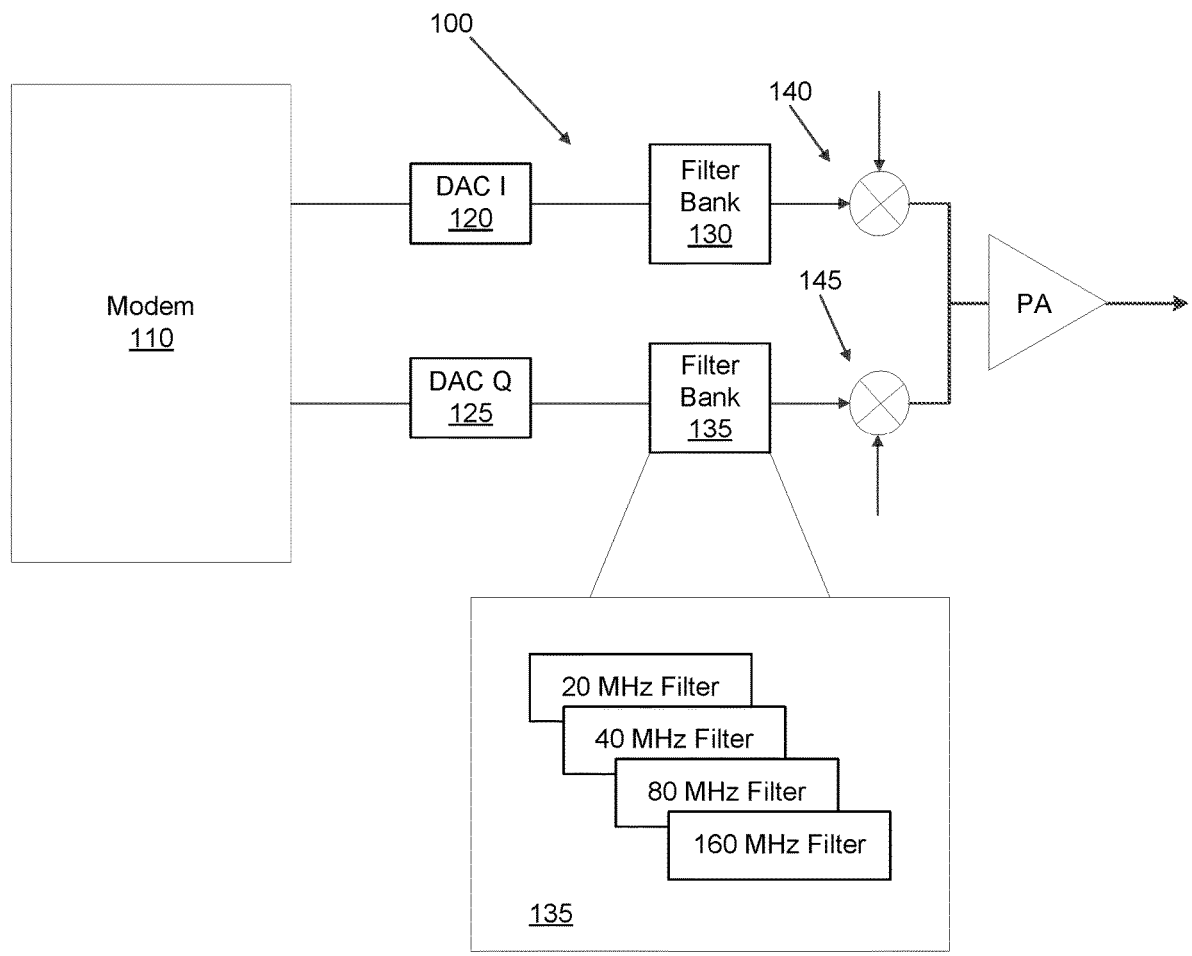
FIG. 1 illustrates a transmitter architecture in which a plurality of baseband filters is provided to filter a corresponding plurality of signal widths.

Modern transmitters support many different bandwidths. An example WiFi transmitter architecture 100 is illustrated in FIG. 1. The architecture 100 supports transmission of signals in four different signal bandwidths: 20 MHz, 40 MHz, 80 MHz, and 160 MHz. The transmitter line up includes a modem 110 that outputs a series of digital data samples of an information signal being communicated by the transmitted signal. The digital data samples generated by the modem 110 have an I component and a Q component, which are processed in parallel prior to being combined for transmission. A digital to analog converter (DAC) 120 samples the series of I components to generate an analog signal. The analog signal is filtered by a selected filter in a filter bank 130. The filtered analog signal is upconverted to RF by an upconverter 140. The Q components follow a similar processing path that includes a DAC 125 and a filter bank 135. The upconverted filtered analog I signal output by the up-converter 140 is combined with the upconverted filtered analog Q signal output by the up-converter 145. The combined signal is amplified by a power amplifier for transmission by an antenna (not shown).

One design challenge in supporting multiple bandwidths is caused by the filtering that is performed on the output of the DAC in the I and Q processing paths. The output of the DAC is filtered to remove replicas of the digital information signal in the output signal that are caused by the sampling process performed by the DAC. To achieve good filtering results, it is beneficial to use a filter having a bandwidth equal to the bandwidth of the signal being filtered. Thus, in the architecture 100, the filter banks 130, 135 include four filters, one for each transmit bandwidth. A filter is selected from the filter bank 130, 135 to filter the output of the DAC 120, 125 depending on the transmit bandwidth. While this approach generates satisfactory filtering, it is inefficient in terms of power and silicon area.

Another approach to supporting several transmit bandwidths is to use a single filter that has the same bandwidth as the widest transmit bandwidth (e.g., 160 MHz in the architecture 100). Using a single wide bandwidth filter has several disadvantages. For example, the filter should have a sharp drop in frequency response to meet the desired replica rejection which complicates the design and may necessitate use of an active filter. To avoid the sharp drop in frequency response, the sampling rate of the DAC may be increased, but this places the signal replicas farther away from the first Nyquist zone. Use of a single wide bandwidth filter thus leads to an increase in design complexity, silicon area, cost, and power consumption.

Figure 2:
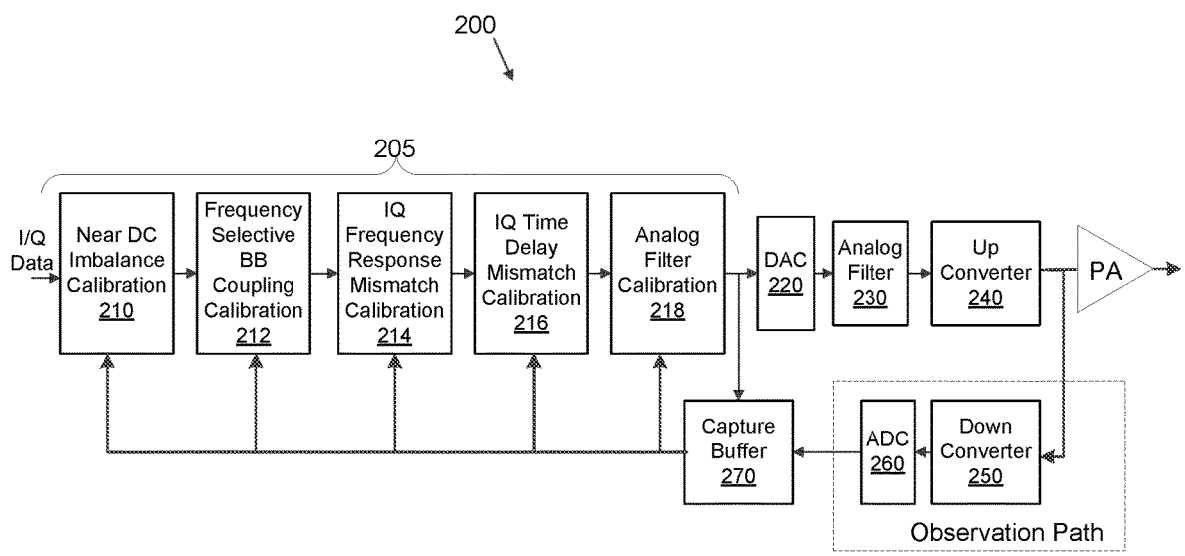
FIG. 2 illustrates a transmitter architecture in which a plurality of digital filters provide pre-compensation for various impairments caused by an analog filter.

FIG. 2 illustrates a transmitter architecture 200 that includes several digital filters 205 that process the digital data sample components in an effort to pre-compensate for the various impairments of the I and Q components caused by an analog filter 230. The architecture 200 includes a DAC 220 which has separate DACs (not shown) for the I component and the Q component. The architecture 200 also includes an analog filter 230, which has separate filters (not shown) for the I component and Q component. Up-converter 240 separately up-converts the I and Q components to RF. The up-converted components are combined and then amplified for transmission by the architecture 200.

To pre-compensate for impairments caused by the analog filter, an observation path is provided to feed the filtered signal back to a capture buffer 270 used by feedback receivers in the digital filters 205. The observation path includes a down-converter 250 that converts the filtered signal back to baseband frequency and an analog to digital converter (ADC) 260 that samples the filtered signal and stores the samples as feedback data in the capture buffer 270. The various digital filters 210, 212, 214, 216, 218 input data from the capture buffer 270 and adjust the digital I/Q data based on the feedback data from the capture buffer 270. The digital filters 205 will now be briefly individually described.

A near DC imbalance calibration filter 210 estimates the near-DC IQ gain imbalance and phase imbalance using a feedback receiver, and applies digital pre-compensation in order to achieve an overall "zero" near-DC IQ imbalance. A frequency selective IQ baseband (BB) Coupling Calibration Filter 212 estimates the frequency-selective IQ BB coupling using a feedback receiver and applies digital pre-compensation (e.g., de-coupling) in order to achieve an overall "zero" IQ BB coupling.

An IQ frequency response mismatch calibration filter 214 estimates the IQ frequency-selective gain and phase imbalance which are caused by I/Q frequency response mismatch using a feedback receiver and applies a digital correction filter on one of the components in order to achieve an overall "zero" frequency-response-related IQ mismatch. An IQ time delay mismatch calibration filter 216 estimates the I/Q time delay mismatch using a feedback receiver and applies a digital fractional delay filter on the early quadrature component in order to achieve an overall "zero" time delay mismatch, which in turn introduces frequency-selective phase imbalance. An analog filter calibration filter 218 estimates the analog filter frequency response using a feedback receiver and applies an inverse digital filter in order to achieve an overall flat frequency response.

The various digital filters 210, 212, 214, 216, 218 of the architecture 200 each represent a separate hardware block, increasing the complexity of design, debug, and integration efforts. Each filter is separately calibrated and the calibration process for each filter should be repeated periodically in the field due to temperature and voltage variations. This repeated re-calibration degrades throughput.

Disclosed herein are apparatus and methods that utilize a pre-emphasis digital filter that compensates for impairments caused by differences between filter bandwidth and transmit signal bandwidth. The disclosed pre-emphasis digital filter also adapts to changing analog filter performance. This allows a single narrow bandwidth filter to be used on the output of the DAC in the transmitter lineup, which saves cost, simplifies the design, and conserves silicon area.

The present disclosure will now be described with reference to the attached figures, wherein like reference numerals are used to refer to like elements throughout, and wherein the illustrated structures and devices are not necessarily drawn to scale. As utilized herein, terms "module", "component," "system," "circuit," "element," "slice," "circuitry," and the like are intended to refer to a computer-related entity, hardware, software (e.g., in execution), and/or firmware. For example, circuitry or similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 3:
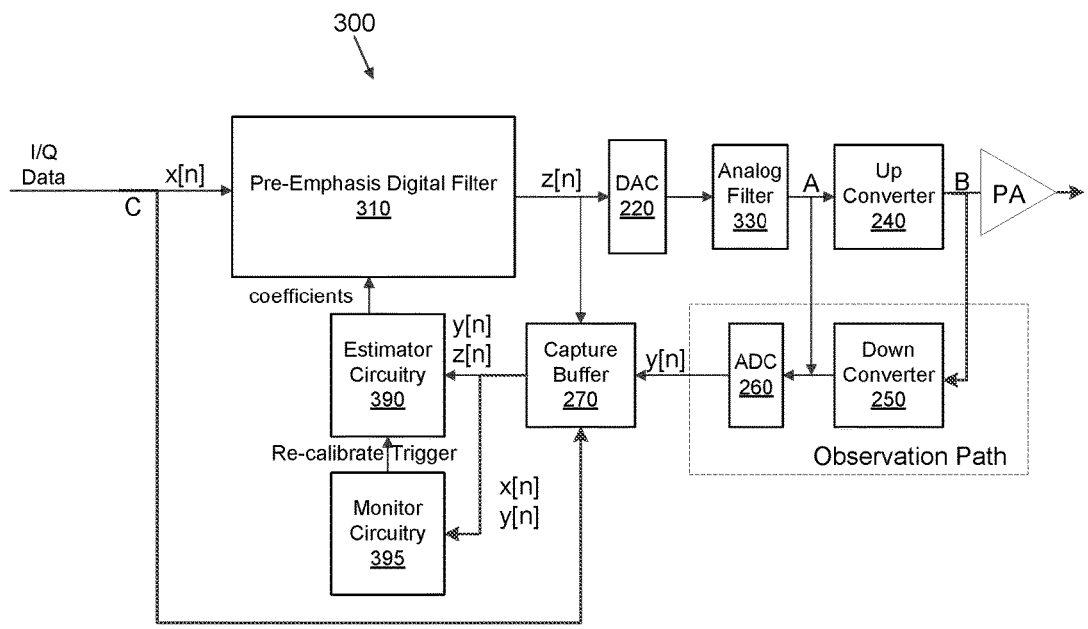
FIG. 3 illustrates a simplified block diagram of a transmitter architecture in which a pre-emphasis digital filter compensates for quadrature imbalances according to one embodiment of the disclosure.

FIG. 3 illustrates one example embodiment of a transmitter architecture 300 that includes a pre-emphasis digital filter 310, estimator circuitry 390, and monitor circuitry 395. The architecture 300 eliminates the use of several, separately calibrated, filters (e.g., 205 in FIG. 2) and allows for a single analog filter 330 to be used to filter the output of the DAC 220 for multiple transmit bandwidths. In one embodiment, the analog filter 330 has a bandwidth that is selected to be equivalent to a narrowest transmit bandwidth supported by the architecture 300. In one embodiment, the pre-emphasis digital filter 310 is a finite impulse response (FIR) filter controlled by a plurality of complex coefficients.

The pre-emphasis digital filter 310 is controlled based at least on three different digital signals: x[n], y[n], and z[n], which are all stored by the capture buffer 270. The signal x[n] is the series of "pure" digital input data samples being communicated by the transmitted signal. The signal x[n] is provided to the capture buffer 270 by way of path C. The signal z[n] is the output of the pre-emphasis digital filter 310 (sometimes referred to herein as series of "pre-emphasized data samples"). The signal y[n] is a digital representation of the filtered signal output by the analog filter 330. For the purposes of this description, the term "corresponding" refers to digital signals taken at the same value of "n". For example, digital input data sample signal x[n], when filtered by the pre-emphasis filter 310 is transformed into a corresponding pre-emphasized data sample z[n] and after filtering by the analog filter 330 the digital input data sample signal x[n] and the pre-emphasized data sample z[n] are transformed into a corresponding filtered signal y[n].

To obtain the signal y[n], the architecture 300 uses one of two possible observation paths. Observation path A feeds the signal output by the analog filter 330 to the ADC 260. Observation path B includes the up-converter 240 and the down-converter 250 as described with respect to FIG. 2. While observation path A may be preferable because it eliminates the down-converter 250, observation path B may already be provided by the architecture 300 for other reasons and can thus be used "free of charge."

By way of overview, the pre-emphasis digital filter 310 is configured to filter the series of digital input data samples (i.e., x[n]) according to a plurality of coefficients, which are determined by the estimator circuitry 390, to generate a series of pre-emphasized data samples (i.e., z[n]). The DAC 220 is configured to sample the series of pre-emphasized data samples to generate an analog signal. The analog filter 230 is configured to filter the analog signal to generate a filtered signal. The observation path is configured to feedback a sample of the filtered signal to the estimator circuitry 390.

The architecture 300 operates in two modes: calibration and monitoring. During calibration mode, the estimator circuitry 390 computes coefficients for the pre-emphasis digital filter 310. During calibration of the pre-emphasis digital filter 310, the estimator circuitry 390 is configured to: i) input a sample of the filtered signal y[n]; ii) input a pre-emphasized data sample z[n] that resulted in the sample of the filtered signal (sometimes referred to as the "corresponding sample of the filtered signal"); and iii) compute the plurality of coefficients used by the pre-emphasis digital filter 310 by solving for a filter function that, when applied to the pre-emphasized data sample z[n], will bring the filtered signal y[n] into equivalence with the pre-emphasized data sample. The phrase "equivalence with" means to within some predetermined threshold voltage deviation with respect to one another and does not require that the sample z[n] is precisely equal to y[n]. In other words, when the voltage difference between y[n] and z[n] is less than some percentage or range, y[n] is said to be in "equivalence with" z[n].

The architecture of the pre-emphasis digital filter 310 and the coefficient computations made by the estimator circuitry 390 are derived based on the following mathematical model. The digital signal y[n] can be expressed as follows:

$$y[n]=\Sigma_{k=1,K}\Sigma_{n=0,N}q_{kn}Re\{x[N-n]\}^k+\Sigma_{k=1,K}\Sigma_{n=0,N}r_{kn}Im\{x[N-n]\}^k \quad (1)$$

Where $q_{kn}$ and $r_{kn}$ are coefficients applied to the I and Q components of data samples by the pre-emphasis digital filter 310, respectively. In most cases K will be equal to 1. If the analog filter is based on active filters, which could exhibit non-linear behavior, K can be greater than 1. N defines the order of the pre-emphasis digital filter 310, which corrects for the analog filter's impairments.

When the pre-emphasis digital filter 310 is perfectly compensating for the analog filter impairments, (x,y) in equation 1 can be substituted with (y,z) to solve for coefficients that will bring the filtered signal y[n] into equivalence with the output of the pre-emphasis digital filter 310 z[n]:

$$z[n]=\Sigma_{k=1,K}\Sigma_{n=0,N}q_{kn}Re\{y[N-n]\}^k+\Sigma_{k=1,K}\Sigma_{n=0,N}r_{kn}Im\{y[N-n]\}^k \quad (2)$$

The matrix Z, which is the N order output of the pre-emphasis digital filter 310, can be expressed as a function of the matrix Y, which is the N order output of the analog filter 330, and the coefficients in vector d (which contains the coefficients $q_{kn}$ and $r_{kn}$):

$$\bar{Z}=\bar{Y}\cdot\bar{d} \quad (3)$$

An estimated solution for the matrix d is:

$$\bar{d}=(\bar{Y}^H\bar{Y})^{-1}\cdot(\bar{Y}^H\bar{Z}) \quad (4)$$

The real and imaginary parts of the output of the analog filter output (and the intended output of the pre-emphasis digital filter 310) are:

$$Re(y[n])=I(n)\cdot a_{11}+I(n-1)\cdot a_{12}+Q(n)\cdot b_{11}+Q(n-1)\cdot b_{12}+I^3(n)\cdot a_{31}+I^3(n-1)\cdot a_{32}+Q^3(n)\cdot b_{31}+Q^3(n-1)\cdot b_{32} \quad (5)$$

$$Im(y[n])=I(n)\cdot c_{11}+I(n-1)\cdot c_{12}+Q(n)\cdot d_{11}+Q(n-1)\cdot d_{12}+I^3(n)\cdot c_{31}+I^3(n-1)\cdot c_{32}+Q^3(n)\cdot d_{31}+Q^3(n-1)\cdot d_{32} \quad (6)$$

where $a_{11}$, $a_{12}$, $b_{11}$, $b_{12}$, $a_{31}$, $a_{32}$, $b_{31}$, $b_{32}$, $c_{11}$, $c_{12}$, $d_{11}$, $d_{12}$, $c_{31}$, $c_{32}$, $d_{31}$, and $d_{32}$ are complex coefficients in the matrix d that are determined by the estimator circuitry 390.

In this manner, the pre-emphasis digital filter 310 is assigned a filter function that will bring the filtered signal from the analog filter 330 into equivalence with the output of the pre-emphasis digital filter 310. This indirect technique allows the pre-emphasis digital filter 310 to compensate for any impairments and/or drifting being presently caused by the analog filter 330. As controlled by the estimator circuitry 390, the pre-emphasis digital filter 310 can compensate for many types of impairments related to analog filters.

A first impairment is destructive signal spectral shaping by the narrow filter (hereinafter "bandwidth" impairment). The effect of this impairment on the I and Q components of a data sample can be expressed generally as:

$$\check{I}(n)=\alpha\cdot I(n)+\beta\cdot I(n-1)+\ldots+\psi I(n-\xi) \quad (7)$$

$$\check{Q}(n)=\eta\cdot Q(n)+\zeta\cdot Q(n-1)+\ldots+\epsilon Q(n-\xi) \quad (8)$$

A second impairment is skew (i.e., time delay difference and bandwidth mismatch) between the analog filter for the I component and the analog filter for the Q component which results in frequency-selective quadrature gain/phase imbalance (hereinafter "skew" impairment). The effect of this impairment on the I and Q components of a data sample can be expressed generally as:

$$\check{I}(n)=\alpha\cdot I(n)+\beta\cdot I(n-1)+\ldots+\psi I(n-\xi)+\eta'\cdot Q(n)+\zeta'\cdot Q^{(n-1)}+\ldots+\epsilon'Q(n-\xi) \quad (9)$$

$$\check{Q}(n)=\eta\cdot Q(n)+\zeta\cdot Q(n-1)+\ldots+\epsilon Q(n-\xi)+\alpha'\cdot I(n)+\beta'\cdot I(n-1)+\ldots+\psi' I(n-\xi) \quad (10)$$

A third impairment is leakage between the I and Q components caused by physical coupling and/or phase imbalance (both of which could be frequency-selective), once again resulting in frequency-selective quadrature gain/phase imbalance (hereinafter "leakage" impairment). The effect of this impairment on the I and Q components of a data sample can be expressed generally as:

$$\check{I}=\alpha\cdot I+\beta\cdot Q \quad (11)$$

$$\check{Q}=\gamma\cdot Q+\delta\cdot I \quad (12)$$

Other impairments that can be compensated by the pre-emphasis digital filter 310 include the five different impairments addressed by the digital filters in FIG. 2 and/or drifting due to voltage and temperature changes.

During monitoring mode, the monitor circuitry 395 is configured to compare a sample of the filtered analog signal y[n] to a corresponding input data sample x[n] (i.e., the x[n] that resulted in the y[n]) to determine if the pre-emphasis digital filter 310 is satisfactorily compensating for the analog filter. When a difference between the sample of the filtered signal and the input data sample exceeds a threshold, the monitor circuitry is configured to trigger the estimator circuitry 390 to re-calculate the coefficients based on present pre-emphasized data samples and present samples of the filtered signal stored in the capture buffer 270. In one embodiment, the monitor circuitry 395 computes the signal to noise ratio (SNR) of the input data sample x[n] to the filtered signal y[n] and when the SNR exceeds a threshold, the monitor circuitry 395 triggers the estimator circuitry to re-compute the coefficients for the pre-emphasis digital filter 310.

Figure 4:
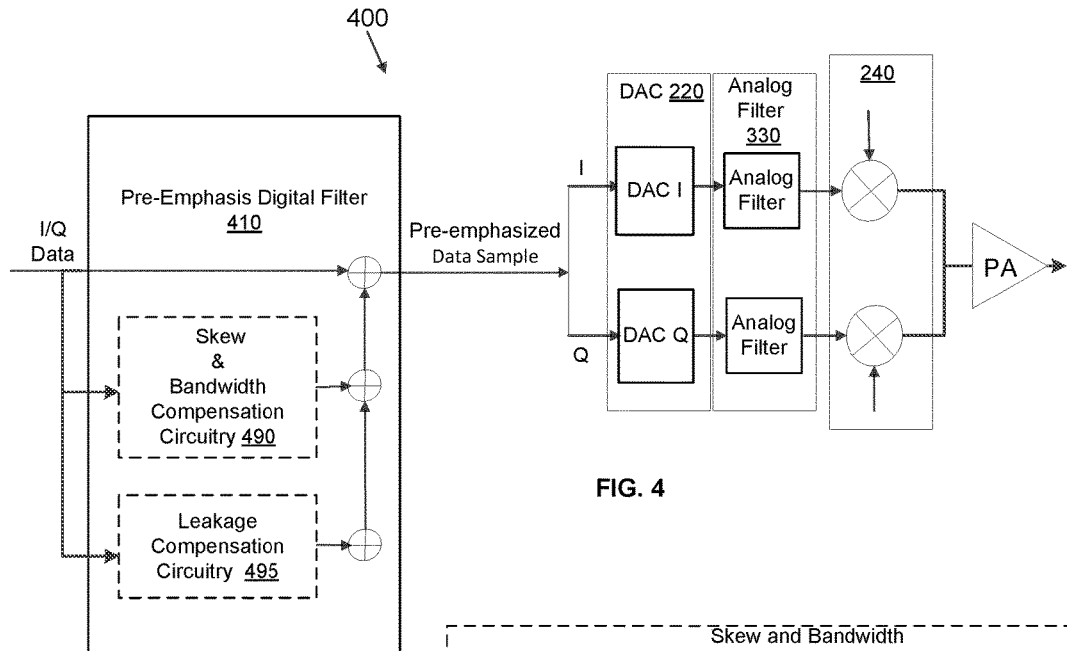
FIG. 4 illustrates a simplified block diagram of the pre-emphasis digital filter of FIG. 3 according to one embodiment of the disclosure.

FIG. 4 illustrates a transmitter architecture 400 that includes one embodiment of a pre-emphasis digital filter 410. The pre-emphasis digital filter 410 includes skew and bandwidth compensation circuitry 490 and leakage compensation circuitry 495. The leakage compensation circuitry 495 is configured to generate, for each input data sample, a leakage compensated I component and a leakage compensated Q component (not shown separately). The skew and bandwidth compensation circuitry 490 is configured to generate, for each input data sample, a skew and bandwidth compensated I component and a skew and bandwidth compensated Q component (not shown separately).

It can be seen in FIG. 4 that the pre-emphasis digital filter 410 is configured to add an I component of the input data sample to the leakage compensated I component and the skew and bandwidth compensated I component to generate a pre-emphasized I component (not shown separately). The pre-emphasis digital filter 410 is configured to add a Q component of the input data sample to the leakage compensated Q component and the skew and bandwidth compensated Q component to generate a pre-emphasized Q component. The pre-emphasis digital filter 410 is configured to combine the pre-emphasized I component with the pre-emphasized Q component to generate the pre-emphasized data sample.

Figure 5:
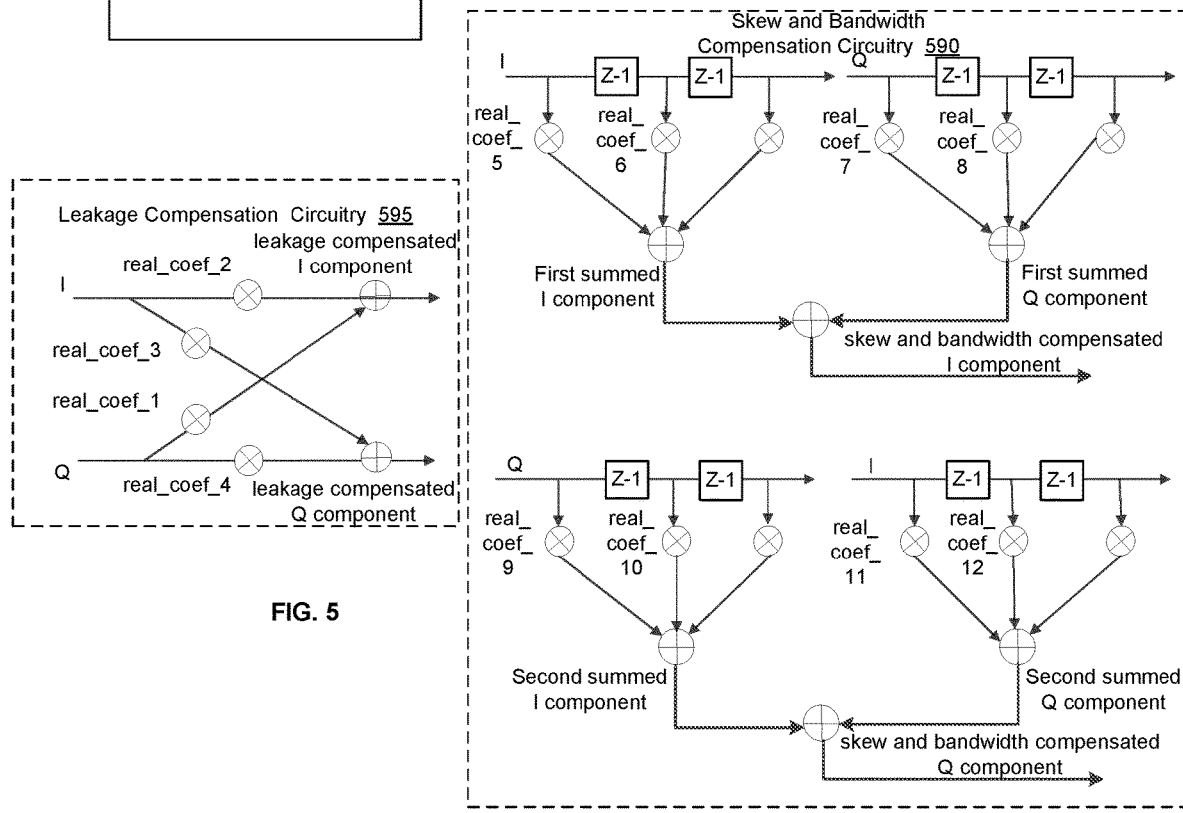
FIG. 5 illustrates a more detailed functional diagram of various circuitries in the pre-emphasis filter of FIG. 4 according to one embodiment of the disclosure.

FIG. 5 illustrates one example embodiment of leakage compensation circuitry 595 and skew and bandwidth compensation circuitry 590. It can be seen that various real coefficients 1-12 are applied to present and previous I and Q components of data samples to generate corresponding portions of the I and Q components. A separate path is provided in each circuitry 590, 595 for the I and Q component. The estimator circuitry 390 (FIG. 3) uses feedback data for y[n] and z[n] in the capture buffer 270 (FIG. 3) to estimate the coefficient values. In one embodiment, the estimator circuitry 390 uses least mean squares (LMS) to estimate the coefficient values.

It can be seen in FIG. 5 that leakage compensation circuitry 595 is configured to add a first portion of a Q component of an input data sample to a second portion of an I component of the input data sample to generate the leakage compensated I component, wherein the first portion and second portion are controlled by a first coefficient and a second coefficient. Leakage compensation circuitry 595 is configured to add a third portion of the I component of the input data sample to a fourth portion of the Q component of the input data sample to generate the leakage compensated Q component, wherein the third portion and fourth portion are controlled by a third coefficient and a fourth coefficient.

It can be seen in FIG. 5 that skew and bandwidth compensation circuitry 590 is configured to add a fifth portion of an I component of the input data sample to a sixth portion of an I component of an immediately prior input data sample to generate a first summed I component, wherein the fifth portion and sixth portion are controlled by a fifth coefficient and a sixth coefficient. Skew and bandwidth compensation circuitry 590 is configured to add a seventh portion of a Q component of the input data sample to an eighth portion of a Q component of an immediately prior input data sample to generate a first summed Q component, wherein the seventh portion and eighth portion are controlled by a seventh coefficient and an eighth coefficient. Skew and bandwidth compensation circuitry 590 is configured to add the first summed I component and the first summed Q component to generate the skew and bandwidth compensated I component.

Skew and bandwidth compensation circuitry 590 is configured to add a ninth portion of an I component of the input data sample to a tenth portion of an I component of an immediately prior input data sample to generate a second summed I component, wherein the ninth portion and tenth portion are controlled by a ninth coefficient and a tenth coefficient, respectively, of the plurality of coefficients. Skew and bandwidth compensation circuitry 590 is configured to add an eleventh portion of a Q component of the input data signal to a twelfth portion of a Q component of an immediately prior input data sample signal to generate a second summed Q component, wherein the eleventh portion and twelfth portion are controlled by an eleventh coefficient and a twelfth coefficient, respectively, of the plurality of coefficients. Skew and bandwidth compensation circuitry 590 is configured to add the second summed I component and the second summed Q component to generate the skew and bandwidth compensated Q component.

While particular compensation circuitries 590, 595 are shown in FIG. 5, any number of different circuitries could be used to implement the filter function and the estimator circuitry 390 may be adapted to calculate appropriate coefficients for the chosen circuitries.

Figure 6:
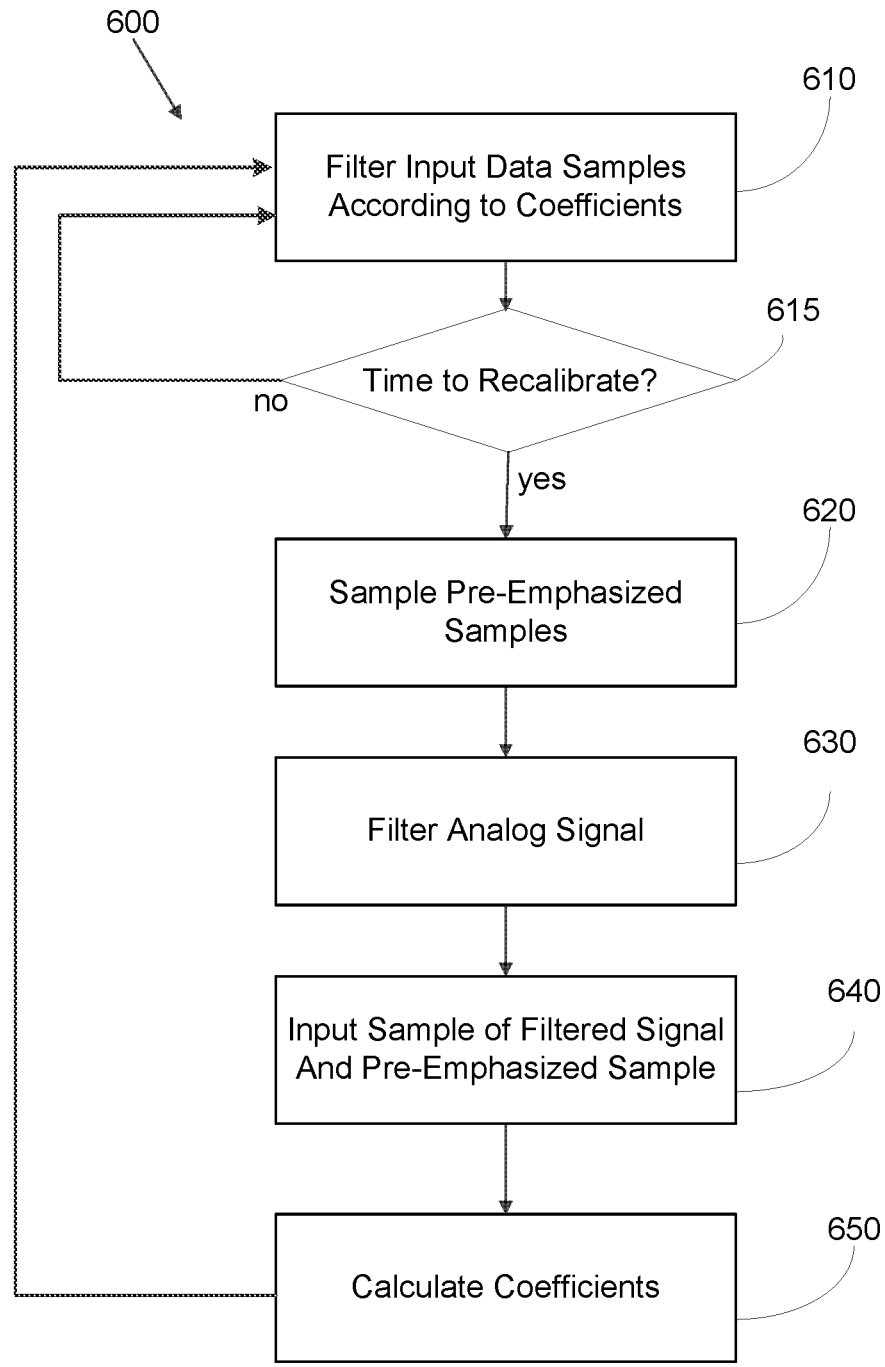
FIG. 6 illustrates a flowchart that outlines a method for implementing a pre-emphasis digital filter to compensate for quadrature imbalances according to one embodiment of the disclosure.

FIG. 6 depicts a flowchart outlining one embodiment of a method 600 for pre-emphasizing a digital data sample to compensate for impairments introduced by an analog filter acting on the digital data. The method 600 may be performed, for example, by the analog filter 330, the DAC 220, digital pre-emphasis filter 310, 410, estimator circuitry 390, and/or monitor circuitry 395 of FIGS. 1-5. At 610, the method includes filtering a series of respective digital input data samples according to a plurality of coefficients to generate a series of respective corresponding pre-emphasized data samples. At 615, a determination is made as to whether it is time to re-calibrate (e.g., compute or re-compute the coefficients). In one embodiment, the determination is made by inputting the sample of the filtered signal and input a corresponding input data sample that resulted in the sample of the filtered signal. The sample of the filtered signal is compared to the input data sample. When a difference between the sample of the filtered signal and the input data sample exceeds a threshold, the method moves to 620. When the difference does not exceed the threshold, the method returns to 610 and normal operation continues.

At 620, the series of pre-emphasized data samples is sampled to generate an analog signal. At 630, the analog signal is filtered to generate a filtered signal. At 640, the method includes inputting i) a pre-emphasized data sample (e.g., z[n]) and ii) a corresponding sample of the filtered signal (e.g., y[n]). At 650 the plurality of coefficients is calculated based on the sample of the filtered signal and the pre-emphasized data sample. In one embodiment, the plurality of coefficients is calculated by solving for a filter function that, when applied to the pre-emphasized data sample, will bring the filtered signal into equivalence with the pre-emphasized data sample.

It can be seen from the foregoing description that the disclosed pre-emphasis digital filter results in silicon area savings and lower cost. Only a single analog filter with a narrow bandwidth is included in the design, simplifying and shortening the design process. Digital filters are more accurate and predictable than analog filters and have linear phase. The pre-emphasis digital filter is adaptive to the narrow analog filter and compensates accurately for the analog filter variation over process, voltage, and temperature. Use of a single narrow bandwidth filter means that the DAC may be operated at a lower clock rate, saving power and simplifying the design. The pre-emphasis digital filter also cancels out quadrature gain imbalance and phase imbalance, both near-DC and frequency-selective. If the baseband stage of the transmitter exhibits considerable non-linear behavior, the pre-emphasis digital filter can cancel that as well. The pre-emphasis digital filter compensates for time delay mismatch and coupling between the real analog filters (I and Q component filters).

Figure 7:
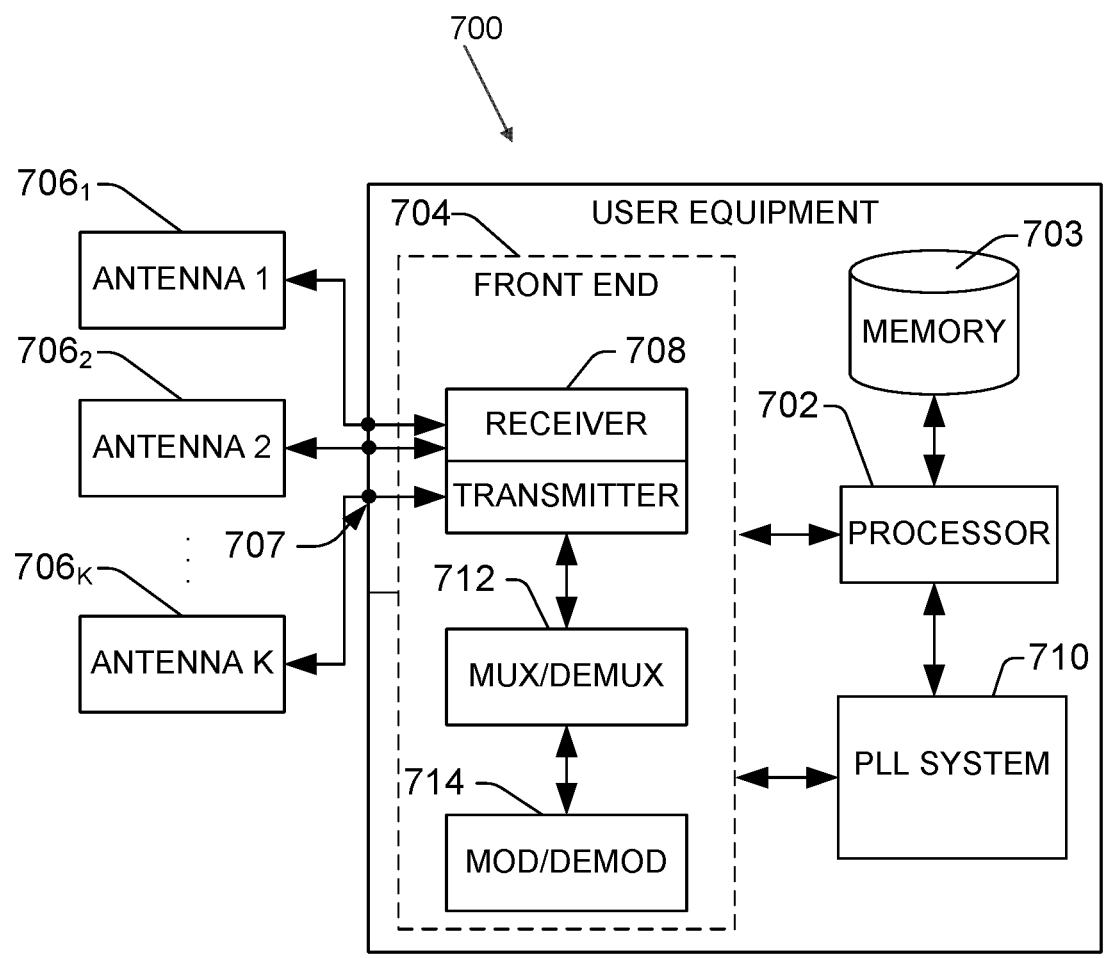
FIG. 7 illustrates an example user equipment device that includes a transmitter front end that includes a pre-emphasis digital filter in accordance with various aspects described.

To provide further context for various aspects of the disclosed subject matter, FIG. 7 illustrates a block diagram of an embodiment of user equipment 700 (e.g., a mobile device, communication device, personal digital assistant, etc.) related to access of a network (e.g., base station, wireless access point, femtocell access point, and so forth) that can enable and/or exploit features or aspects of the disclosed aspects.

The user equipment or mobile communication device 700 can be utilized with one or more aspects of the digital pre-emphasis filter described herein according to various aspects. The user equipment device 700, for example, comprises a digital baseband processor 702 that can be coupled to a data store or memory 703, a front end 704 (e.g., an RF front end, an acoustic front end, or the other like front end) and a plurality of antenna ports 707 for connecting to a plurality of antennas 706₁ to 706k (k being a positive integer). The antennas 706₁ to 706k can receive and transmit signals to and from one or more wireless devices such as access points, access terminals, wireless ports, routers and so forth, which can operate within a radio access network or other communication network generated via a network device (not shown).

The user equipment 700 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 704 can include a communication platform, which comprises electronic components and associated circuitry that provide for processing, manipulation or shaping of the received or transmitted signals via one or more receivers or transmitters (e.g. transceivers) 708, a mux/demux component 712, and a mod/demod component 714. The front end 704 is coupled to the digital baseband processor 702 and the set of antenna ports 707, in which the set of antennas 706₁ to 706k can be part of the front end. In one aspect, the user equipment device 700 can comprise a phase locked loop system 710.

The processor 702 can confer functionality, at least in part, to substantially any electronic component within the mobile communication device 700, in accordance with aspects of the disclosure. As an example, the processor 700 can be configured to execute, at least in part, executable instructions that compute the coefficients of the pre-emphasis digital filter of FIGS. 3-5. Thus the processor 700 may embody various aspects of the pre-emphasis digital filter, estimator circuitry, and monitor circuitry of FIGS. 3-5 as a multi-mode operation chipset that affords pre-emphasis for digital input data samples to compensate for impairments due to an analog filter.

The processor 702 is functionally and/or communicatively coupled (e.g., through a memory bus) to memory 703 in order to store or retrieve information necessary to operate and confer functionality, at least in part, to communication platform or front end 704, the phase locked loop system 710 and substantially any other operational aspects of the phase locked loop system 710. The phase locked loop system 710 includes at least one oscillator (e.g., a VCO, DCO or the like) that can be calibrated via core voltage, a coarse tuning value, signal, word or selection process according the various aspects described herein.

The processor 702 can operate to enable the mobile communication device 700 to process data (e.g., symbols, bits, or chips) for multiplexing/demultiplexing with the mux/demux component 712, or modulation/demodulation via the mod/demod component 714, such as implementing direct and inverse fast Fourier transforms, selection of modulation rates, selection of data packet formats, inter-packet times, etc. Memory 703 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a transmitter including: a pre-emphasis digital filter configured to filter a series of respective digital input data samples according to a plurality of coefficients to generate a series of respective corresponding pre-emphasized data samples; a digital-to-analog converter (DAC) configured to sample the series of pre-emphasized data samples to generate an analog signal; an analog filter configured to filter the analog signal to generate a filtered signal; and estimator circuitry configured to: input a pre-emphasized data sample; input a corresponding sample of the filtered signal; and calculate the plurality of coefficients based on the sample of the filtered signal and the pre-emphasized data sample.

Example 2 includes the subject matter of example 1, including or omitting optional elements, wherein the estimator circuitry is configured to calculate the plurality of coefficients by solving for a filter function that, when applied to the pre-emphasized data sample, will bring the filtered signal into equivalence with the pre-emphasized data sample.

Example 3 includes the subject matter of example 1, including or omitting optional elements, including an observation path configured to feedback a sample of the filtered signal to the estimator circuitry, wherein the observation path comprises an analog-to-digital converter (ADC) that inputs the filtered signal and generates the sample of the filtered signal.

Example 4 includes the subject matter of example 1, including or omitting optional elements, including an observation path configured to feedback a sample of the filtered signal to the estimator circuitry, wherein the observation path includes: an up-converter configured to convert the filtered signal from a baseband frequency to radio frequency (RF) to generate an RF filtered signal for transmission by the transmitter; a down-converter configured to convert the RF filtered signal back to the baseband frequency to generate a filtered baseband signal; and an analog-to-digital converter (ADC) configured to: generate a sample of the filtered baseband signal; and feedback the sample to the estimator circuitry.

Example 5 includes the subject matter of examples 1, 2, 3, and 4, including or omitting optional elements, wherein the pre-emphasis digital filter includes: leakage compensation circuitry configured to generate, for each input data sample, a leakage compensated I component and a leakage compensated Q component; and skew and bandwidth compensation circuitry configured to generate, for each input data sample, a skew and bandwidth compensated I component and a skew and bandwidth compensated Q component. The pre-emphasis digital filter is configured to: add an I component of the input data sample to the leakage compensated I component and the skew and bandwidth compensated I component to generate a pre-emphasized I component; and add a Q component of the input data sample to the leakage compensated Q component and the skew and bandwidth compensated Q component to generate a pre-emphasized Q component; combine the pre-emphasized I component with the pre-emphasized Q component to generate the pre-emphasized data sample.

Example 6 includes the subject matter of example 5, including or omitting optional elements, wherein the leakage compensation circuitry is configured to: add a first portion of a Q component of an input data sample to a second portion of an I component of the input data sample to generate the leakage compensated I component, wherein the first portion and second portion are controlled by a first coefficient and a second coefficient, respectively, of the plurality of coefficients; and add a third portion of the I component of the input data sample to a fourth portion of the Q component of the input data sample to generate the leakage compensated Q component, wherein the third portion and fourth portion are controlled by a third coefficient and a fourth coefficient, respectively, of the plurality of coefficients.

Example 7 includes the subject matter of example 5, including or omitting optional elements, wherein the skew and bandwidth compensation circuitry configured to: add a fifth portion of an I component of the input data sample to a sixth portion of an I component of an immediately prior input data sample to generate a first summed I component, wherein the fifth portion and sixth portion are controlled by a fifth coefficient and a sixth coefficient, respectively, of the plurality of coefficients; add a seventh portion of a Q component of the input data sample to an eighth portion of a Q component of an immediately prior input data sample to generate a first summed Q component, wherein the seventh portion and eighth portion are controlled by a seventh coefficient and an eighth coefficient, respectively, of the plurality of coefficients; add the first summed I component and the first summed Q component to generate the skew and bandwidth compensated I component; add a ninth portion of an I component of the input data sample to a tenth portion of an I component of an immediately prior input data sample to generate a second summed I component, wherein the ninth portion and tenth portion are controlled by a ninth coefficient and a tenth coefficient, respectively, of the plurality of coefficients; add an eleventh portion of a Q component of the input data signal to a twelfth portion of a Q component of an immediately prior input data sample signal to generate a second summed Q component, wherein the eleventh portion and twelfth portion are controlled by an eleventh coefficient and a twelfth coefficient, respectively, of the plurality of coefficients; add the second summed I component and the second summed Q component to generate the skew and bandwidth compensated Q component.

Example 8 includes the subject matter of example 1, including or omitting optional elements, including monitor circuitry configured to: input the sample of the filtered signal; input a corresponding input data sample; compare the sample of the filtered signal to the input data sample; determine if a difference between the sample of the filtered signal and the input data sample exceeds a threshold; and trigger the estimator circuitry to re-calculate the coefficient based on present pre-emphasized data samples and present samples of the filtered signal when the difference exceeds the threshold.

Example 9 includes the subject matter of example 1, including or omitting optional elements, wherein the transmitter is configured to transmit in a selected one of two or more bandwidths, and wherein a bandwidth of the analog filter is selected as a narrowest bandwidth of the two or more bandwidths.

Example 10 is a method including: filtering a series of respective digital input data samples according to a plurality of coefficients to generate a series of respective corresponding pre-emphasized data samples; sampling the series of pre-emphasized data samples to generate an analog signal; filtering the analog signal to generate a filtered signal; inputting a pre-emphasized data sample; inputting a corresponding sample of the filtered signal; and calculating the plurality of coefficients based on the sample of the filtered signal and the pre-emphasized data sample.

Example 11 includes the subject matter of example 10, including or omitting optional elements, including calculating the plurality of coefficients by solving for a filter function that, when applied to the pre-emphasized data sample, will bring the filtered signal into equivalence with the pre-emphasized data sample.

Example 12 includes the subject matter of example 10, including or omitting optional elements, including generating the sample of the filtered signal by inputting the filtered signal to an ADC.

Example 13 includes the subject matter of example 10, including or omitting optional elements, including: converting the filtered signal from a baseband frequency to radio frequency (RF) to generate an RF filtered signal for transmission by a transmitter; converting the RF filtered signal back to the baseband frequency to generate a filtered baseband signal; inputting the filtered baseband signal to an ADC to generate the sample of the filtered signal; and providing the sample of the filtered baseband signal to the estimator circuitry.

Example 14 includes the subject matter of examples 10, 11, 12, and 13, including or omitting optional elements, including: generating, for each input data sample, a leakage compensated I component and a leakage compensated Q component; and generating, for each input data sample, a skew and bandwidth compensated I component and a skew and bandwidth compensated Q component; adding an I component of the input data sample to the leakage compensated I component and the skew and bandwidth compensated I component to generate a pre-emphasized I component; adding a Q component of the input data sample to the leakage compensated Q component and the skew and bandwidth compensated Q component to generate a pre-emphasized Q component; and combining the pre-emphasized I component with the pre-emphasized Q component to generate the pre-emphasized data sample.

Example 15 includes the subject matter of examples 10, 11, 12, and 13, including or omitting optional elements, including: inputting the sample of the filtered signal; inputting an input data sample that resulted in the sample of the filtered signal; comparing the sample of the filtered signal to the input data sample; when a difference between the sample of the filtered signal and the input data sample exceeds a threshold, triggering the estimator circuitry to re-calculate the coefficient based on present pre-emphasized data samples and present samples of the filtered signal.

Example 16 is a pre-emphasis digital filter configured to filter a series of digital input data samples according to a plurality of coefficients to generate a series of pre-emphasized data samples. The filter includes: leakage compensation circuitry configured to generate, for each input data sample, a leakage compensated I component and a leakage compensated Q component; and skew and bandwidth compensation circuitry configured to generate, for each input data sample, a skew and bandwidth compensated I component and a skew and bandwidth compensated Q component; wherein the pre-emphasis digital filter is configured to: add an I component of the input data sample to the leakage compensated I component and the skew and bandwidth compensated I component to generate a pre-emphasized I component; and add a Q component of the input data sample to the leakage compensated Q component and the skew and bandwidth compensated Q component to generate a pre-emphasized Q component; combine the pre-emphasized I component with the pre-emphasized Q component to generate the pre-emphasized data sample.

Example 17 includes the subject matter of example 16, including or omitting optional elements, including estimator circuitry configured to: input a sample of a filtered signal, wherein the filtered signal is generated by sampling the series of pre-emphasized data samples to generate an analog signal and filtering the analog signal with an analog filter; input a corresponding pre-emphasized digital; calculate the plurality of coefficients based on the filtered signal and the pre-emphasized data sample.

Example 18 includes the subject matter of example 17, including or omitting optional elements, wherein the estimator circuitry is configured to calculate the plurality of coefficients by solving for a filter function that, when applied to the pre-emphasized data sample, will bring the filtered signal into equivalence with the pre-emphasized data sample.

Example 19 includes the subject matter of examples 17 and 18, including or omitting optional elements, including monitor circuitry configured to: input an input data sample; input a corresponding sample of the filtered signal; determine a difference between the sample of the filtered signal and the input data sample; and trigger the estimator circuitry to re-calculate the coefficients based on present pre-emphasized data samples and present samples of the filtered signal when the difference exceeds a threshold.

Example 20 includes the subject matter of example 16, including or omitting optional elements, wherein the leakage compensation circuitry is configured to: add a first portion of a Q component of an input data sample to a second portion of an I component of the input data sample to generate the leakage compensated I component, wherein the first portion and second portion are controlled by a first coefficient and a second coefficient, respectively, of the plurality of coefficients; and add a third portion of the I component of the input data sample to a fourth portion of the Q component of the input data sample to generate the leakage compensated Q component, wherein the third portion and fourth portion are controlled by a third coefficient and a fourth coefficient, respectively, of the plurality of coefficients.

Example 21 includes the subject matter of example 20, including or omitting optional elements, wherein the skew and bandwidth compensation circuitry configured to: add a fifth portion of an I component of the input data sample to a sixth portion of an I component of an immediately prior input data sample to generate a first summed I component, wherein the fifth portion and sixth portion are controlled by a fifth coefficient and a sixth coefficient, respectively, of the plurality of coefficients; add a seventh portion of a Q component of the input data sample to an eighth portion of a Q component of an immediately prior input data sample to generate a first summed Q component, wherein the seventh portion and eighth portion are controlled by a seventh coefficient and an eighth coefficient, respectively, of the plurality of coefficients; add the first summed I component and the first summed Q component to generate the skew and bandwidth compensated I component; add a ninth portion of an I component of the input data sample to a tenth portion of an I component of an immediately prior input data sample to generate a second summed I component, wherein the ninth portion and tenth portion are controlled by a ninth coefficient and a tenth coefficient, respectively, of the plurality of coefficients; add an eleventh portion of a Q component of the input data signal to a twelfth portion of a Q component of an immediately prior input data sample signal to generate a second summed Q component, wherein the eleventh portion and twelfth portion are controlled by an eleventh coefficient and a twelfth coefficient, respectively, of the plurality of coefficients; add the second summed I component and the second summed Q component to generate the skew and bandwidth compensated Q component.

Example 22 is a method of filtering a series of digital input data samples according to a plurality of coefficients to generate a series of pre-emphasized data samples, including: generating, for each input data sample, a leakage compensated I component and a leakage compensated Q component; and generating, for each input data sample, a skew and bandwidth compensated I component and a skew and bandwidth compensated Q component; adding an I component of the input data sample to the leakage compensated I component and the skew and bandwidth compensated I component to generate a pre-emphasized I component; adding a Q component of the input data sample to the leakage compensated Q component and the skew and bandwidth compensated Q component to generate a pre-emphasized Q component; and combining the pre-emphasized I component with the pre-emphasized Q component to generate the pre-emphasized data sample.

Example 23 includes the subject matter of example 22, including or omitting optional elements, including: inputting a sample of a filtered signal, wherein the filtered signal is generated by sampling the series of pre-emphasized data samples to generate an analog signal and filtering the analog signal with an analog filter; inputting a corresponding pre-emphasized data sample; and calculating the plurality of coefficients based on the filtered signal and the pre-emphasized data sample.

Example 24 includes the subject matter of example 23, including or omitting optional elements, including calculating the plurality of coefficients by solving for a filter function that, when applied to the pre-emphasized data sample, will bring the filtered signal into equivalence with the pre-emphasized data sample.

Example 25 includes the subject matter of example 23, including or omitting optional elements, including inputting the sample of the filtered signal; inputting a corresponding input data sample; determining a difference between the sample of the filtered signal and the input data sample; and triggering the estimator circuitry to re-calculate the coefficient based on present pre-emphasized data samples and present samples of the filtered signal when the difference exceeds a threshold.

Example 26 is an apparatus including: means for filtering a series of respective digital input data samples according to a plurality of coefficients to generate a series of respective corresponding pre-emphasized data samples; means for sampling the series of pre-emphasized data samples to generate an analog signal; means for filtering the analog signal to generate a filtered signal; and means for calculating the plurality of coefficients based on the sample of the filtered signal and the pre-emphasized data sample.

Example 27 is an apparatus for filtering a series of digital input data samples according to a plurality of coefficients to generate a series of pre-emphasized data samples including: means for generating, for each input data sample, a leakage compensated I component and a leakage compensated Q component; and means for generating, for each input data sample, a skew and bandwidth compensated I component and a skew and bandwidth compensated Q component; means for adding an I component of the input data sample to the leakage compensated I component and the skew and bandwidth compensated I component to generate a pre-emphasized I component; means for adding a Q component of the input data sample to the leakage compensated Q component and the skew and bandwidth compensated Q component to generate a pre-emphasized Q component; and means for combining the pre-emphasized I component with the pre-emphasized Q component to generate the pre-emphasized data sample.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. A transmitter comprising:
a pre-emphasis digital filter configured to filter a series of respective digital input data samples according to a plurality of coefficients to generate a series of respective corresponding preemphasized data samples;
a digital-to-analog converter (DAC) configured to sample the series of pre-emphasized data samples to generate an analog signal;
an analog filter configured to:
filter the analog signal to generate a filtered signal, and
provide the filtered signal to an input of a power amplifier of the transmitter; and estimator circuitry configured to:
receive a pre-emphasized data sample from the pre-emphasis digital filter,
receive a corresponding sample of the filtered signal, calculate the plurality of coefficients using the sample of the filtered signal and the pre-emphasized data sample, and provide the coefficients to the pre-emphasis digital filter.

2. The transmitter of claim 1, comprising an observation path configured to feedback a sample of the filtered signal to the estimator circuitry, wherein the observation path comprises an analog-to-digital converter (ADC) that inputs the filtered signal and generates the sample of the filtered signal.

3. The transmitter of claim 1, comprising an observation path configured to feedback a sample of the filtered signal to the estimator circuitry, wherein the observation path comprises:

an up-converter configured to convert the filtered signal from a baseband frequency to radio frequency (RF) to generate an RF filtered signal for transmission by the transmitter;

a down-converter configured to convert the RF filtered signal back to the baseband frequency to generate a filtered baseband signal; and an analog-to-digital converter (ADC) configured to:
generate a sample of the filtered baseband signal; and
feedback the sample to the estimator circuitry.

4. The transmitter of claim 1, wherein the pre-emphasis digital filter comprises:

leakage compensation circuitry configured to generate, for each input data sample, a leakage compensated I component and a leakage compensated Q component; and skew and bandwidth compensation circuitry configured to generate, for each input data sample, a skew and bandwidth compensated I component and a skew and bandwidth compensated Q component;

wherein the pre-emphasis digital filter is configured to:
add an I component of the input data sample to the leakage compensated I component and the skew and bandwidth compensated I component to generate a pre-emphasized I component;

add a Q component of the input data sample to the leakage compensated Q component and the skew and bandwidth compensated Q component to generate a pre-emphasized Q component; and combine the pre-emphasized I component with the pre-emphasized Q component to generate the pre-emphasized data sample.

5. The transmitter of claim 1, comprising monitor circuitry configured to:
input the sample of the filtered signal;
input a corresponding input data sample;
compare the sample of the filtered signal to the input data sample;
determine if a difference between the sample of the filtered signal and the input data sample exceeds a threshold; and
trigger the estimator circuitry to re-calculate the coefficient based on present pre-emphasized data samples and present samples of the filtered signal when the difference exceeds the threshold.

6. The transmitter of claim 1 wherein the transmitter is configured to transmit in a selected one of two or more bandwidths, and wherein a bandwidth of the analog filter is selected as a narrowest bandwidth of the two or more bandwidths.

7. The transmitter of claim 1, wherein the estimator circuitry is configured to calculate the plurality of coefficients by adjusting the plurality of coefficients to bring the filtered signal into equivalence with the pre-emphasized data sample.

8. The transmitter of claim 4, wherein the leakage compensation circuitry is configured to:

add a first portion of a Q component of an input data sample to a second portion of an I component of the input data sample to generate the leakage compensated I component, wherein the first portion and second portion are controlled by a first coefficient and a second coefficient, respectively, of the plurality of coefficients; and add a third portion of the I component of the input data sample to a fourth portion of the Q component of the input data sample to generate the leakage compensated Q component, wherein the third portion and fourth portion are controlled by a third coefficient and a fourth coefficient, respectively, of the plurality of coefficients.

9. The transmitter of claim 4, wherein the skew and bandwidth compensation circuitry configured to:

add a fifth portion of an I component of the input data sample to a sixth portion of an I component of an immediately prior input data sample to generate a first summed I component, wherein the fifth portion and sixth portion are controlled by a fifth coefficient and a sixth coefficient, respectively, of the plurality of coefficients;

add a seventh portion of a Q component of the input data sample to an eighth portion of a Q component of an immediately prior input data sample to generate a first summed Q component, wherein the seventh portion and eighth portion are controlled by a seventh coefficient and an eighth coefficient, respectively, of the plurality of coefficients;

add the first summed I component and the first summed Q component to generate the skew and bandwidth compensated I component;

add a ninth portion of an I component of the input data sample to a tenth portion of an I component of an immediately prior input data sample to generate a second summed I component, wherein the ninth portion and tenth portion are controlled by a ninth coefficient and a tenth coefficient, respectively, of the plurality of coefficients; and add an eleventh portion of a Q component of the input data signal to a twelfth portion of a Q component of an immediately prior input data sample signal to generate a second summed Q component, wherein the eleventh portion and twelfth portion are controlled by an eleventh coefficient and a twelfth coefficient, respectively, of the plurality of coefficients; and add the second summed I component and the second summed Q component to generate the skew and bandwidth compensated Q component.

10. A method comprising:
filtering, with a pre-emphasis digital filter, a series of respective digital input data samples according to a plurality of coefficients to generate a series of respective corresponding pre-emphasized data samples;
sampling the series of pre-emphasized data samples to generate an analog signal;
filtering the analog signal to generate a filtered signal;
providing the filtered signal to an input of a power amplifier of a transmitter;
receiving a pre-emphasized data sample from the pre-emphasis digital filter;

receiving a corresponding sample of the filtered signal; and calculating the plurality of coefficients using the sample of the filtered signal and the pre-emphasized data sample, and providing the coefficients to the pre-emphasis digital filter.

11. The method of claim 10, comprising: generating the sample of the filtered signal by inputting the filtered signal to an ADC.

12. The method of claim 10, comprising:
converting the filtered signal from a baseband frequency to radio frequency (RF) to generate an RF filtered signal for transmission by a transmitter;
converting the RF filtered signal back to the baseband frequency to generate a filtered baseband signal; and
inputting the filtered baseband signal to an ADC to generate the sample of the filtered signal; and
providing the sample of the filtered baseband signal to estimator circuitry.

13. The method of claim 10, comprising:
generating, for each input data sample, a leakage compensated I component and a leakage compensated Q component; and
generating, for each input data sample, a skew and bandwidth compensated I component and a skew and bandwidth compensated Q component;
adding an I component of the input data sample to the leakage compensated I component and the skew and bandwidth compensated I component to generate a pre-emphasized I component;
adding a Q component of the input data sample to the leakage compensated Q component and the skew and bandwidth compensated Q component to generate a pre-emphasized Q component; and
combining the pre-emphasized I component with the pre-emphasized Q component to generate the pre-emphasized data sample.

14. The method of claim 10, comprising:
inputting the sample of the filtered signal;
inputting an input data sample that resulted in the sample of the filtered signal;
comparing the sample of the filtered signal to the input data sample;
when a difference between the sample of the filtered signal and the input data sample exceeds a threshold, triggering estimator circuitry to re-calculate the coefficient based on present pre-emphasized data samples and present samples of the filtered signal.

15. A pre-emphasis digital filter configured to filter a series of digital input data samples according to a plurality of coefficients to generate a series of pre-emphasized data samples, the pre-emphasis digital filter comprising:
leakage compensation circuitry configured to generate, for each input data sample, a leakage compensated I component and a leakage compensated Q component; and
skew and bandwidth compensation circuitry configured to generate, for each input data sample, a skew and bandwidth compensated I component and a skew and bandwidth compensated Q component;
wherein the pre-emphasis digital filter is configured to:
add an I component of the input data sample to the leakage compensated I component and the skew and bandwidth compensated I component to generate a pre-emphasized I component,
add a Q component of the input data sample to the leakage compensated Q component and the skew and bandwidth compensated Q component to generate a pre-emphasized Q component, and
combine the pre-emphasized I component with the pre-emphasized Q component to generate the pre-emphasized data sample; and estimator circuitry configured to:
receive a sample of a filtered signal that is an input to a power amplifier of a transmitter, wherein the filtered signal is generated by sampling the series of pre-emphasized data samples to generate an analog signal and filtering the analog signal with an analog filter;
receive a corresponding pre-emphasized digital samples from the pre-emphasis digital filter;
calculate the plurality of coefficients using the filtered signal and the pre-emphasized data sample, and
provide the coefficients to the pre-emphasis digital filter.

16. The pre-emphasis digital filter of claim 15, wherein the estimator circuitry is configured to calculate the plurality of coefficients by solving for a filter function that, when applied to the pre-emphasized data sample, will bring the filtered signal into equivalence with the pre-emphasized data sample.

17. The pre-emphasis digital filter of claim 15, comprising monitor circuitry configured to:
input an input data sample;
input a corresponding sample of the filtered signal;
determine a difference between the sample of the filtered signal and the input data sample; and
trigger the estimator circuitry to re-calculate the coefficients based on present pre-emphasized data samples and present samples of the filtered signal when the difference exceeds a threshold.

18. The pre-emphasis digital filter of claim 15, wherein the leakage compensation circuitry is configured to:
add a first portion of a Q component of an input data sample to a second portion of an I component of the input data sample to generate the leakage compensated I component, wherein the first portion and second portion are controlled by a first coefficient and a second coefficient, respectively, of the plurality of coefficients; and
add a third portion of the I component of the input data sample to a fourth portion of the Q component of the input data sample to generate the leakage compensated Q component, wherein the third portion and fourth portion are controlled by a third coefficient and a fourth coefficient, respectively, of the plurality of coefficients.

19. The pre-emphasis digital filter of claim 18, wherein the skew and bandwidth compensation circuitry configured to:
add a fifth portion of an I component of the input data sample to a sixth portion of an I component of an immediately prior input data sample to generate a first summed I component, wherein the fifth portion and sixth portion are controlled by a fifth coefficient and a sixth coefficient, respectively, of the plurality of coefficients;
add a seventh portion of a Q component of the input data sample to an eighth portion of a Q component of an immediately prior input data sample to generate a first summed Q component, wherein the seventh portion and eighth portion are controlled by a seventh coefficient and an eighth coefficient, respectively, of the plurality of coefficients;

add the first summed I component and the first summed Q component to generate the skew and bandwidth compensated I component;

add a ninth portion of an I component of the input data sample to a tenth portion of an I component of an immediately prior input data sample to generate a second summed I component, wherein the ninth portion and tenth portion are controlled by a ninth coefficient and a tenth coefficient, respectively, of the plurality of coefficients;

add an eleventh portion of a Q component of the input data signal to a twelfth portion of a Q component of an immediately prior input data sample signal to generate a second summed Q component, wherein the eleventh portion and twelfth portion are controlled by an eleventh coefficient and a twelfth coefficient, respectively, of the plurality of coefficients; and add the second summed I component and the second summed Q component to generate the skew and bandwidth compensated Q component.

20. A method of filtering a series of digital input data samples according to a plurality of coefficients to generate a series of pre-emphasized data samples, the method comprising:

with a pre-emphasis digital filter,
generating, for each input data sample, a leakage compensated I component and a leakage compensated Q component,
generating, for each input data sample, a skew and bandwidth compensated I component and a skew and bandwidth compensated Q component, adding an 1 component of the input data sample to the leakage compensated I component and the skew and bandwidth compensated component to generate a pre-emphasized I component,
adding a Q component of the input data sample to the leakage compensated Q component and the skew and bandwidth compensated Q component to generate a pre-emphasized Q component, and
combining the pre-emphasized I component with the pre-emphasized Q component to generate the pre-emphasized data sample;

receiving a sample of a filtered signal that is an input to a power amplifier of a transmitter, wherein the filtered signal is generated by sampling the series of pre-emphasized data samples to generate an analog signal and filtering the analog signal with an analog filter;

receiving, from the pre-emphasis digital filter, a corresponding pre-emphasized data sample of the series of pre-emphasized data samples; and calculating the plurality of coefficients using the filtered signal and the pre-emphasized data sample, and providing the coefficients to the pre-emphasis digital filter.

21. The method of claim 20, comprising calculating the plurality of coefficients by solving for a filter function that, when applied to the pre-emphasized data sample, will bring the filtered signal into equivalence with the pre-emphasized data sample.

22. The method of claim 20, comprising:
inputting the sample of the filtered signal;
inputting a corresponding input data sample;
determining a difference between the sample of the filtered signal and the input data sample; and
triggering estimator circuitry to re-calculate the coefficient based on present pre-emphasized data samples and present samples of the filtered signal when the difference exceeds a threshold.

23. The method of claim 10, comprising calculating the plurality of coefficients by adjusting the plurality of coefficients to bring the filtered signal into equivalence with the pre-emphasized data sample.

* * * * *